Jan. 15, 1946.  R. H. WAGER  2,393,078
INVERTED VENT CHECK VALVE
Filed Oct. 12, 1943  2 Sheets-Sheet 1

Inventor
R. H. Wager.
By
H. B. Willson & Co. Attorney

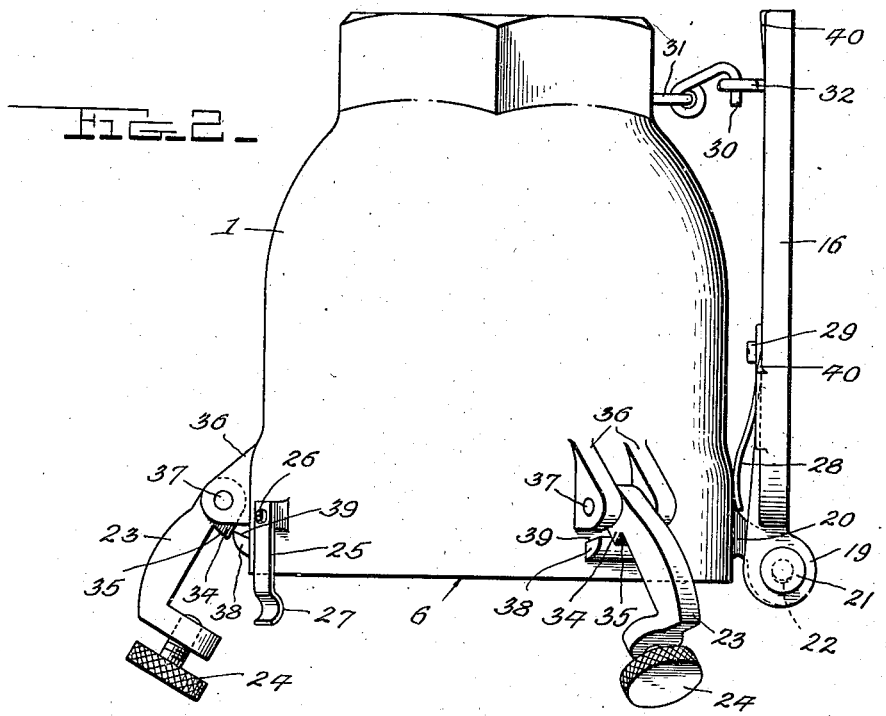
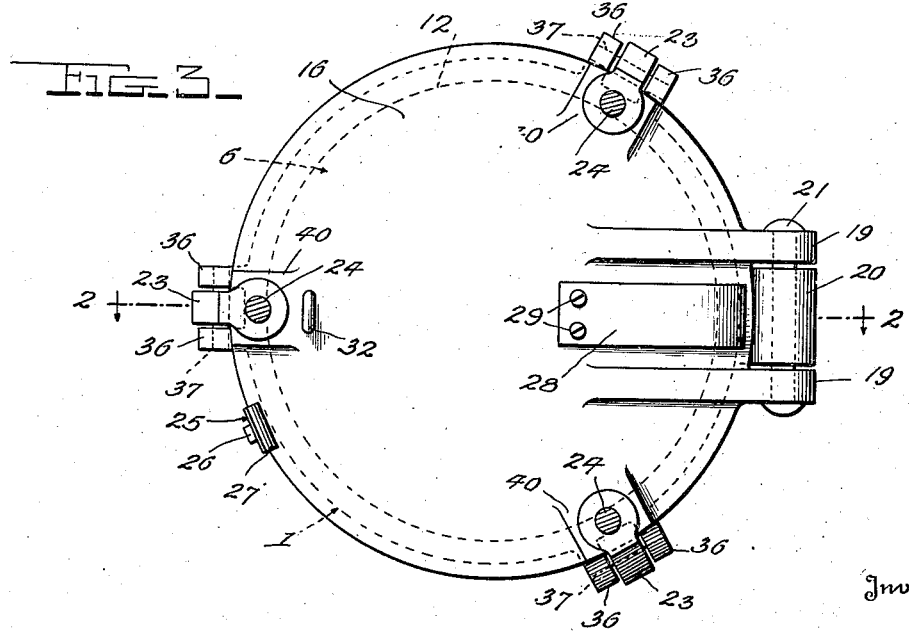

Patented Jan. 15, 1946

2,393,078

UNITED STATES PATENT OFFICE 2,393,078

INVERTED VENT CHECK VALVE

Robert Hudson Wager, Maplewood, N. J.

Application October 12, 1943, Serial No. 505,981

9 Claims. (Cl. 137—69)

The invention relates to inverted vent check valves of the type shown in Patent No. 1,851,084, March 29, 1932. Such check valves are used to prevent the entrance of water through the vent pipes which rise through the deck of a marine vessel from fuel oil tanks and other compartments of the ship. The upper ends of the vent pipes are bent upon themselves and the check valve casings are secured to their inverted ends. The valve casings house buoyant ball valves adapted to rise into contact with valve seats under the influence of water rising around the exposed parts of the vent pipes, the open lower ends of the casings being covered with fine screens which will exclude flame from the gases within the vent pipes. Such valves are extensively used upon oil tankers and it has been found desirable to quickly close and seal the valve casings in the event the ship has bottom damage caused by a torpedo or otherwise.

One object of the invention is to provide an improved closure means for the open lower end of the check valve casing.

Another object of the invention is to provide a closure for a valve of this character which may be normally secured in open position and which in the event of damage to the ship, may be quickly released and latched in closed position and then securely locked in the latter position to seal the valve casing against high internal pressure.

Further objects of the invention are to provide a closure locking means which will not interfere with the quick closing and latching of the closure or cover of the valve, to provide such a locking means which will permit of effective sealing of the closure or cover, and to provide a locking means in the form of pivoted clamping arms carrying thumb screws wherein the strain is removed from the pivots and all tendency of the clamping arms to work off of the closure, when the screws are tightened, is eliminated.

With the foregoing and other objects in view, the invention resides in the novel subject matter hereinafter described and claimed, and illustrated in the accompanying drawings.

Figure 2 is a side elevation of the valve showing the cover fastened in its opened position and the pivoted clamping arms held in positions to permit quick closing and latching of the cover.

Figure 3 is a bottom plan view with the cover in its closed position.

Figure 1:
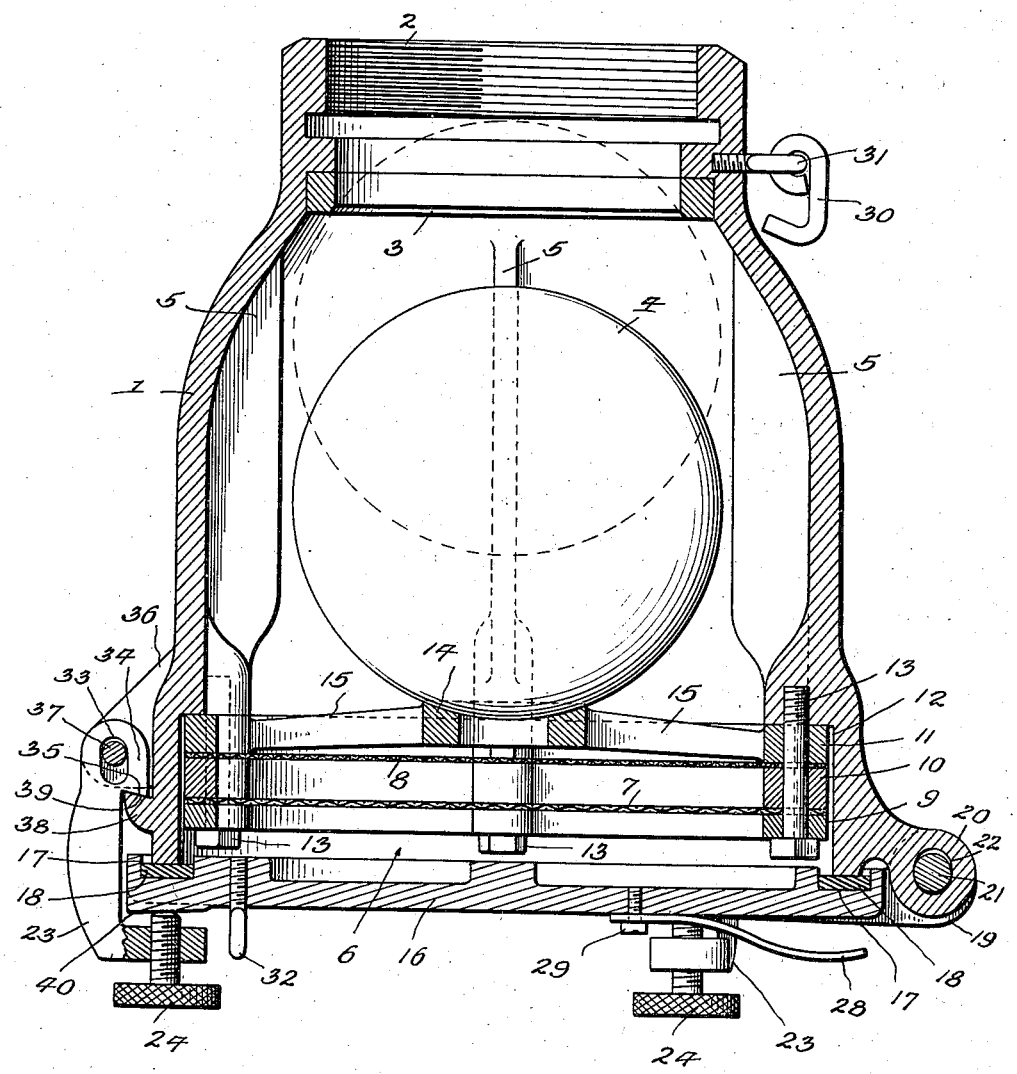
Figure 1 is a central vertical sectional view of an inverted vent check valve embodying the improvements, showing the cover locked and sealed in closed position.

Preferred features of construction have been illustrated and will be specifically described, with the understanding, however, that within the scope of the invention as claimed, variations may be made.

The valve casing 1 is of generally cylindrical shape and may have its reduced uppper end internally screw threaded as at 2 or otherwise formed for attachment to the inverted end of a vent pipe extending through the deck of a ship from an oil tank or other compartment in the hold. In the upper part of the casing is a continuous downwardly facing valve seat 3 preferably formed on a replaceable ring of corrosion-resisting metal. The valve 4 is preferably in the form of a hollow buoyant ball also made of Monel metal or the like. Formed within the casing are vertical ribs 5 which permit the valve to have limited lateral movement as it moves toward its seat under the influence of water if it enters the lower open end 6 of the casing. Within and across the open bottom of the casing are spaced screens 7 and 8 preferably of corrosion-resisting woven wire, the upper screen 8 having meshes fine enough to prevent the entrance of flame into the casing while the lower screen 7 is of coarser mesh and heavier material and hence, serves to protect the upper one. These screens are clamped between three rings 9, 10 and 11 set in a recessed portion 12 of the slightly enlarged bottom portion of the casing and secured therein by machine screws 13. The uppermost ring 11 forms part of a bonnet which limits the downward movement of the valve 4. This bonnet or spider has a central ring 14 and arms 15 which support it from its outer ring portion 11, the arms being upwardly and inwardly inclined from ring 11 so that said arms and the valve supporting ring 14 are spaced from screen 8 as shown in Fig. 1.

The cover or closure for the open bottom of the casing is in the form of a substantially circular plate 16 and it is preferably hingedly mounted so that it may swing from its closed position shown in Fig. 1 to a vertical position at one side of the upright casing as shown in Fig. 2. Formed on the inner face of the closure plate 16 is an annular groove 17 containing a suitable packing ring 18 to be engaged by the bottom edge 6 of the casing so that the latter may be sealed against high internal pressure. To permit of such sealing, the closure 16 is mounted on the casing for both pivotal movement and limited sliding movement. This is preferably accomplished by forming the closure with a pair of spaced hinge ears 19 to receive between them a hinge ear or lug 20 formed on one side of the casing, a pivot pin 21 passing through the aligned ears, and by making the opening in ear 20 of vertically elongated form, as shown at 22 in Fig. 1, so that said pin may have a limited vertical sliding movement in said ear.

The cover or closure is adapted to be either locked in its closed position and sealed against high internal pressure in the casing and vent pipe, as above indicated, or merely releasably spring-latched in its closed position so that it will automatically open when a predetermined internal pressure in the casing is present, as hereinafter explained. The locking and sealing is accomplished by a plurality of clamp members 23 mounted around the casing at substantially equal distances, three being preferably employed as shown in Fig. 3. Each member is in the form of a substantially L-shaped arm with its free end adapted to swing under the closure when in its closed position and carrying a clamping screw 24 to engage the closure. The spring latch means for releasably holding the cover in its closed position may consist of one or more leaf springs 25 positioned vertically and having their upper ends secured to the outside of the casing as by a screw 26. The lower end of the spring latch 25 extends sufficiently below the bottom of the casing to engage the edge of the closure, said end being formed with a semi-circular portion 27 forming a shoulder to take under the closure plate and releasably hold it closed. The spring latch is so tensioned that it will release the closure when any predetermined pressure is reached within the valve casing.

In order to facilitate the quick closing and latching of the closure, spring means may be interposed between the casing and the closure when in its open vertical position. As shown in Fig. 2, I preferably employ a curved leaf spring 28 fastened at one end by a screw 29 to the outer side of the closure so that its free end thrusts against the side of the casing when the closure is fastened in its open position preferably by a swinging hook 30 pivotally secured to a screw eye 31 on the casing and having its free end engageable with a screw eye 32 on the closure. When the latter is thus hooked in its vertical position, the spring 28 is under sufficient tension to project the cover to its closed position as soon as the hook 30 is disengaged from the eye 32.

The mounting of the clamps or arms 23 on the casing is such that they will not interfere with the quick closing and latching of the cover and will permit one person to quickly and easily lock and seal the cover in an emergency. These advantages are accomplished by mounting the clamping arms for both pivotal and sliding movements and providing them and the casing with coacting elements. Each arm or member 23 has its upper end formed with a longitudinally elongated opening or slot 33 and adjacent thereto is a laterally projecting lug 34 formed with an inclined face or shoulder 35. The slotted end of the clamping arm is positioned between a pair of hinge ears 36 formed on the casing and apertured to receive a pivot pin or pintle 37 which also passes through slot 33, so that the arm may have a limited sliding movement as well as a swinging movement. Formed on the casing adjacent the ears 36 is a lug 38 having on its top a downwardly and inwardly inclined face or shoulder 39. The arrangement and proportioning of these parts are such that when the closure 16 is in its closed and latched position shown in Fig. 1, and clamping screw 24 is tightened against the closure, the inclined face 35 of the lug 34 on the arm is engaged with the inclined face 39 of lug 38 on the casing and all strain produced by tightening the screw 24 is removed from the pivot pin 37. Further the fact that the locking lug 34 overlies the downwardly and inwardly inclined face 39 of the lug on the casing prevents any tendency of the clamping screw, when being tightened, from moving laterally or horizontally on the closure due to the eccentric relation of the screw with respect to the hinge pivot. That tendency of the clamping arm to swing outwardly when screw 24 is being tightened is also overcome by having that screw engage a slightly raised and inwardly and upwardly inclined area 40 formed on the outer face of the cover. The provision of the lost-motion or sliding movement between the members 19, 20 of the hinge and the provision of three equally spaced clamping arms or members 24, insures a tight seal for the cover since the packing ring 18 may be uniformly compressed all around the bottom edge of the casing.

Under some conditions, the clamping arms 23 may be swung on pins 37 to vertical positions with screws 24 projecting upwardly and with the arms resting against the outside of the casing 1.

When screw 24 is turned downwardly, the slot 33 enables the clamping arm to slide upwardly on pin 37 sufficiently to permit the lower end of the arm to swing clear of the cover and when thus swung outwardly, the slot 33 permits the arm to slide downwardly until the inner face of lug 34 is engaged with the outer end face of lug 38 as shown in Fig. 2. The several clamping arms may thus be normally held in their outward inactive positions so that they will not interfere with the quick closing and latching of the cover. When an attendant has released the cover from its vertical position and permitted it to swing to its closed position, it will be held in that position by the spring latch 25 while he moves the arms 23 from their normal retracted positions into clamping relation with the cover and tightens the screws 24. It is thus possible to quickly close and seal the valve covers in the event the ship is torpedoed or otherwise has its bottom damaged, such sealing preventing the escape of air and oil through the vent pipe and valve and hence, preventing loss of buoyancy.

I claim:

1. A device of the class described comprising a casing having an opening in its lower end and a laterally projecting lug adjacent said end, a closure clamp and means mounting it on said casing adjacent said lug for pivotal and sliding movements, said clamp having a stop portion normally abutting the outer end face of said lug and holding said clamp in an outward idle position, said stop portion of said clamp being releasable from engagement with the outer end face of said lug by sliding said clamp, whereby said clamp may then be swung to cover clamping position.

2. A device of the class described comprising a casing having an opening in its lower end and a wall around said opening, said wall having a lateral lug near said lower end, a cover clamp at the exterior of said wall, and a combined pivotal and slidable connection between the upper end of said clamp and said wall, said connection being spaced upwardly from said lug and suspending said clamp for vertical sliding and for swinging movement toward and from said wall, said clamp having a stop on its inner edge to normally abut the edge of the outer end face of said lug and hold said clamp away from said wall, said stop being engageable with said lug edge by downward sliding of said clamp and being disengageable from said lug edge by lifting said clamp.

3. A structure as specified in claim 2; said clamp including a downwardly facing shoulder to lie upon said lug and resist downward strain on said clamp when the latter is swung toward said wall and tightened, whereby said lug performs a two-fold function.

4. In an inverted vent check valve for the vent pipe of a marine vessel compartment and of the type wherein a casing containing a buoyant check valve is attached to the inverted end of the vent pipe and has a normally open cover which must be closed against the open lower end of the casing and quickly clamped in closed position in an emergency to prevent venting of the compartment, the combination of a valve casing having means at its upper end for attachment to the inverted end of a vent pipe and having in its lower end an opening for venting the compartment, a normally open upwardly closable clamp-on-cover for said opening, and a self-acting spring means for temporarily holding said cover against descent the moment said cover is closed, whereby both an attendant's hands will be free for use in quickly clamping said cover in its closed position.

5. In an inverted vent check valve for the vent pipe of a marine vessel compartment and of the type wherein a casing containing a buoyant check valve is attached to the inverted end of the vent pipe and has a normally open cover which must be closed against the open lower end of the casing and quickly clamped in closed position in an emergency to prevent venting of the compartment, the combination of a valve casing having means at its upper end for attachment to the inverted end of a vent pipe and having in its lower end an opening for venting the compartment, a cover clamp movably mounted on said casing and normally occupying a position out of the closing path of said cover, and self-acting spring means for temporarily holding said cover against descent the moment said cover is closed, whereby both of an attendant's hands will be left free for use in moving said cover clamp to operative position and tightening it to quickly secure said cover in closed position.

6. In an inverted vent check valve for the vent pipe of a marine vessel compartment and of the type wherein a casing containing a buoyant check valve is attached to the inverted end of the vent pipe and has a normally open cover which must be closed against the open lower end of the casing and quickly clamped in closed position in an emergency to prevent venting of the compartment, the combination of a substantially cylindrical valve casing having a screw threaded upper end for attachment to the inverted end of a vent pipe and having a flat open lower end to permit venting of the compartment, a cover loosely hinged to said casing to swing upwardly against the lower end of the casing to prevent venting, an annular series of pairs of spaced hinge lugs on the casing spaced above its lower end and equally spaced around the casing, a laterally projecting stop lug on the casing beneath each pair of said hinge lugs and having its upper face inclined downwardly and inwardly toward the axis of the casing, an annular series of L-shaped clamps each having its long arm disposed vertically with its upper end pivotally and slidably mounted between the lugs of a pair of said hinge lugs, the short arms of said clamps projecting inwardly toward the axis of the casing and disposed below the plane of the flat bottom of the latter, a cover clamping screw in the short arm of each of said clamps, the inner edges of the long arms of said clamps being formed adjacent their upper ends with inwardly projecting stop lugs having their lower faces inclined downwardly and inwardly toward the axis of the casing, said stop lugs on the clamps and on the casing being so positioned that the pivotal and slidable mounting of the clamps permits their inclined faces to be engaged when the clamping screws are disposed beneath the lower end of the casing, and also permits the inner faces of the stop lugs on the clamps to rest against the outer end faces of the stop lugs on the casing to hold the clamps out of the path of closing movement of the cover, and a spring latch yieldably and temporarily holding said cover against descent the moment said cover is closed, whereby both of an attendant's hands will be left free for use in sliding and swinging said clamps to position their clamping screws beneath the closed cover and to manipulate said screws to quickly clamp the cover in its closed position.

7. In a closure for an inverted vent check valve, the combination of a casing having an open lower end, a cover for said end, hinge means connecting the cover to the casing for upward closing movement, spaced hinge lugs projecting laterally from the casing at a point spaced from said cover hinge means and also spaced upwardly from the lower end of the casing, a stop lug projecting laterally from the casing at a point beneath said hinge lugs and extending across the space between them, an L-shaped clamp having a short arm carrying a clamping screw to engage said cover when it is in closed position, said clamp having a long arm disposed vertically with its upper end disposed between said hinge lugs, a slot and pin connection between the upper end of said long arm and said hinge lugs permitting said clamp to swing laterally toward and from the casing and to slide vertically with respect to said hinge lugs, a second stop lug formed on the inner edge of the long arm of the clamp adjacent its upper end to coact with said stop lug on the casing, said stop lugs being so arranged with respect to said slot and pin connection that when the inner face of the stop lug on the clamp is engaged with the outer end face of the stop lug on the casing said clamp will be at the limit of its downward sliding movement with respect to said hinge lugs and the clamp will be supported with its screw-carrying short arm out of the closing path of movement of the cover.

8. A structure as specified in claim 7; said stop lug on the clamp having its bottom face inclined downwardly and inwardly and said stop lug on the casing having its top face similarly inclined, said inclined faces of the two stop lugs being engaged when the short arm of the clamp is swung beneath the closed cover and said screws are tightened to clamp the latter.

9. In an inverted vent check valve for the vent pipe of a marine vessel compartment and of the type wherein a casing containing a buoyant check valve is attached to the inverted end of the vent pipe and has a normally open cover which must be closed against the open lower end of the casing and quickly clamped in closed position in an emergency to prevent venting of the compartment, the combination of a valve casing having means at its upper end for attachment to the inverted end of a vent pipe and having its lower end open for venting the compartment, a normally open upwardly closable cover for said open end hinged to said casing for swinging movement from an open vertical position at one side of the casing to a horizontal position against said open end, a manually releasable catch for holding said cover in its open vertical position, spring means for actuating said cover from said open vertical position to said closed horizontal position when said catch is released, a cover clamp movably mounted on the casing and normally occupying a position out of the closing path of said cover, and self-acting means for temporarily holding said cover against descent the moment said cover is closed, whereby both of an attendant's hands will be free for use in moving said cover clamp to operative position and tightening it to quickly secure said cover in closed position against internal pressure within the casing.

ROBERT HUDSON WAGER.